(12) United States Patent
Del Gaizo

(10) Patent No.: US 10,518,815 B2
(45) Date of Patent: Dec. 31, 2019

(54) AIR DEFLECTOR ASSEMBLY FOR AN AUTOMATIC VEHICLE

(71) Applicant: GM GLOBAL TECHNOLOGY OPERATIONS LLC, Detroit, MI (US)

(72) Inventor: Steven A. Del Gaizo, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 15/831,992

(22) Filed: Dec. 5, 2017

(65) Prior Publication Data

US 2019/0168817 A1    Jun. 6, 2019

(51) Int. Cl.
| | |
|---|---|
| *B62D 25/08* | (2006.01) |
| *B62D 37/02* | (2006.01) |
| *B62D 25/10* | (2006.01) |
| *B62D 35/00* | (2006.01) |

(52) U.S. Cl.
CPC .......... *B62D 25/085* (2013.01); *B62D 25/10* (2013.01); *B62D 25/105* (2013.01); *B62D 35/005* (2013.01); *B62D 37/02* (2013.01)

(58) Field of Classification Search
CPC ...... B62D 25/10; B62D 25/085; B62D 37/02; B62D 35/005; B62D 25/105
USPC ......................................... 296/96, 91, 180.1
See application file for complete search history.

(56) References Cited

U.S. PATENT DOCUMENTS

| | | | |
|---|---|---|---|
| 6,540,282 B2 * | 4/2003 | Pettey | B62D 35/007 296/180.5 |
| 7,686,383 B2 * | 3/2010 | Tortosa-Boonacker | B62D 35/005 296/180.1 |
| 9,399,493 B1 * | 7/2016 | Milde, Jr. | B62D 25/12 |
| 2015/0300434 A1 * | 10/2015 | Morales Perez | B62D 35/005 188/264 A |

\* cited by examiner

*Primary Examiner* — Joseph D. Pape
*Assistant Examiner* — Dana D Ivey

(57) ABSTRACT

An automotive vehicle includes a body with an upper surface defined by a front fascia disposed proximate a fore end, and a closure panel with a fore edge proximate the front fascia. A deflector with a first end and a second end is movably coupled to the upper surface and is movable between a stowed position and a deployed position. In the stowed position the second end projects a first distance from the upper surface and in the deployed position the second end projects a second distance from the upper surface. The second distance is greater than the first distance. A controller is configured to, in response to satisfaction of a first operating condition, control an actuator to move the deflector from the stowed position to the deployed position.

20 Claims, 3 Drawing Sheets

AIR DEFLECTOR ASSEMBLY FOR AN AUTOMATIC VEHICLE

TECHNICAL FIELD

The present disclosure relates to automotive vehicles, and more particularly to aerodynamic features of automotive vehicles.

INTRODUCTION

As an automotive vehicle travels, it disturbs the air through which it passes. As the air passes over the vehicle, the air may impart force on the vehicle. Force imparted by air in a direction opposite vehicle motion may be referred to as drag force, while force imparted in a vertical direction may be referred to as lift force if oriented in an upward direction or as downforce if oriented in a downward direction. Vehicle designers therefore design the bodies of vehicles to support desired performance characteristics, accounting for drag, lift, and downforce.

SUMMARY

An automotive vehicle according to the present disclosure includes a body with a fore end, an aft end, a longitudinal axis extending from the fore end to the aft end, and a lateral axis extending orthogonal to the longitudinal axis. The body includes a front fascia disposed proximate the fore end and a closure panel with a fore edge proximate the front fascia. The front fascia and closure panel cooperatively define an upper surface. The vehicle also includes a deflector movably coupled to the upper surface. The deflector has a first end and a second end. The deflector is movable between a stowed position and a deployed position. In the stowed position the second end projects a first distance from the upper surface and in the deployed position the second end projects a second distance from the upper surface. The second distance is greater than the first distance to thereby interrupt a flow of air over the upper surface. The vehicle additionally includes an actuator operably coupled to the deflector and configured to move the deflector from the stowed position to the deployed position. The vehicle further includes a controller in communication with the actuator. The controller is configured to, in response to satisfaction of a first operating condition, control the actuator to move the deflector from the stowed position to the deployed position.

In at least one embodiment, in the stowed position the second end is generally flush with the upper surface.

In at least one embodiment, the deflector is movably coupled to the front fascia.

In at least one embodiment, the deflector is movably coupled to the closure panel.

In at least one embodiment, the actuator is configured to move the deflector from the stowed position to the deployed position by rotating the deflector relative to the upper surface.

In at least one embodiment, the actuator is configured to move the deflector from the stowed position to the deployed position by translating the deflector relative to the upper surface.

In at least one embodiment, the deflector extends generally parallel to the lateral axis.

In at least one embodiment, the first operating condition corresponds to a braking request exceeding a predefined braking threshold or to a steering request exceeding a predefined steering threshold. In such embodiments, the controller may be configured to control the actuator to move the deflector from the stowed position to the deployed position in further response to vehicle speed exceeding a predefined speed threshold. In such embodiments, the controller may be further configured to control the actuator to move the deflector from the deployed position to the stowed position in response to satisfaction of a second operating condition.

An assembly for an automotive vehicle according to the present disclosure includes a front fascia configured to couple to a fore portion of a vehicle foreword of a closure panel. The front fascia and closure panel are cooperable to define an upper surface. A deflector is movably coupled to the upper surface. The deflector has a distal end which is movable between a stowed position and a deployed position. In the stowed position the distal end projects a first distance from the upper surface and in the deployed position the distal end projects a second distance from the upper surface. The second distance is greater than the first distance to thereby interrupt a flow of air over the upper surface. An actuator is operably coupled to the deflector and configured to move the deflector from the stowed position to the deployed position. A controller is in communication with the actuator. The controller is configured to, in response to satisfaction of a first operating condition, control the actuator to move the deflector from the stowed position to the deployed position.

In at least one embodiment, in the stowed position the distal end is generally flush with the upper surface.

In at least one embodiment, the deflector is movably coupled to the front fascia.

In at least one embodiment, the deflector is movably coupled to the closure panel.

In at least one embodiment, the actuator is configured to move the deflector from the stowed position to the deployed position by rotating the deflector relative to the upper surface.

In at least one embodiment, the actuator is configured to move the deflector from the stowed position to the deployed position by translating the deflector relative to the upper surface.

In at least one embodiment, the first operating condition corresponds to a braking request exceeding a predefined braking threshold or to a steering request exceeding a predefined steering threshold. In such embodiments, the controller may be configured to control the actuator to move the deflector from the stowed position to the deployed position in further response to vehicle speed exceeding a predefined speed threshold. In such embodiments, the controller may be further configured to control the actuator to move the deflector from the deployed position to the stowed position in response to satisfaction of a second operating condition.

A method of controlling a vehicle according to the present disclosure includes providing a front fascia configured to couple to a fore portion of a vehicle foreword of a closure panel, with the front fascia and closure panel being cooperable to define an upper surface. The method additionally includes providing a deflector movably coupled to the upper surface, with the deflector having a distal end being movable between a stowed position and a deployed position. In the stowed position the distal end projects a first distance from the upper surface and in the deployed position the distal end projects a second distance from the upper surface. The second distance is greater than the first distance to thereby interrupt a flow of air over the upper surface. The method also includes providing an actuator operably coupled to the deflector and configured to move the deflector from the stowed position to the deployed position. The method further includes providing a controller in communication with the actuator. The method still further includes, in response to satisfaction of a first operating condition, automatically controlling the actuator, via the controller, to move the deflector from the stowed position to the deployed position.

Embodiments according to the present disclosure provide a number of advantages. For example, the present disclosure provides a system for increasing downforce for traction when desired, and moreover does so without unduly increasing drag or adversely affecting vehicle styling considerations.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Vehicle design is driven by a variety of considerations, including aerodynamic performance and desirable styling. In some vehicle body designs, air may accelerate as it passes along the hood of the vehicle, thereby creating a pressure differential between the hood and the underbody of the vehicle similar to the pressure differential between suction and pressure surfaces of an airfoil. This pressure differential may have an undesirable impact on the traction between vehicle wheels and the driving surface.

Figure 1:
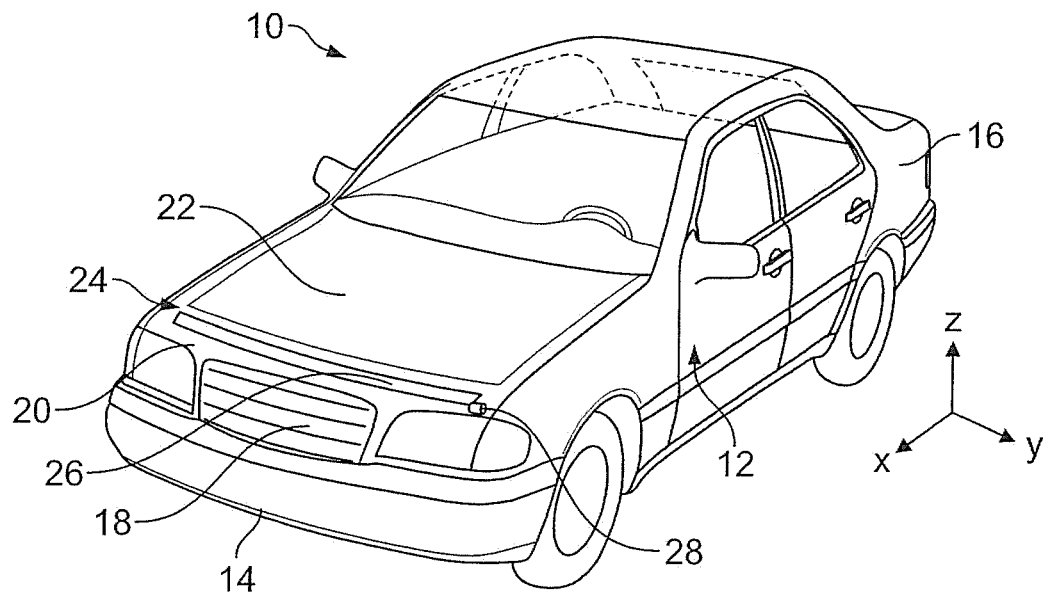
FIG. 1 illustrates an automotive vehicle according to an embodiment of the present disclosure.
Figure 2:
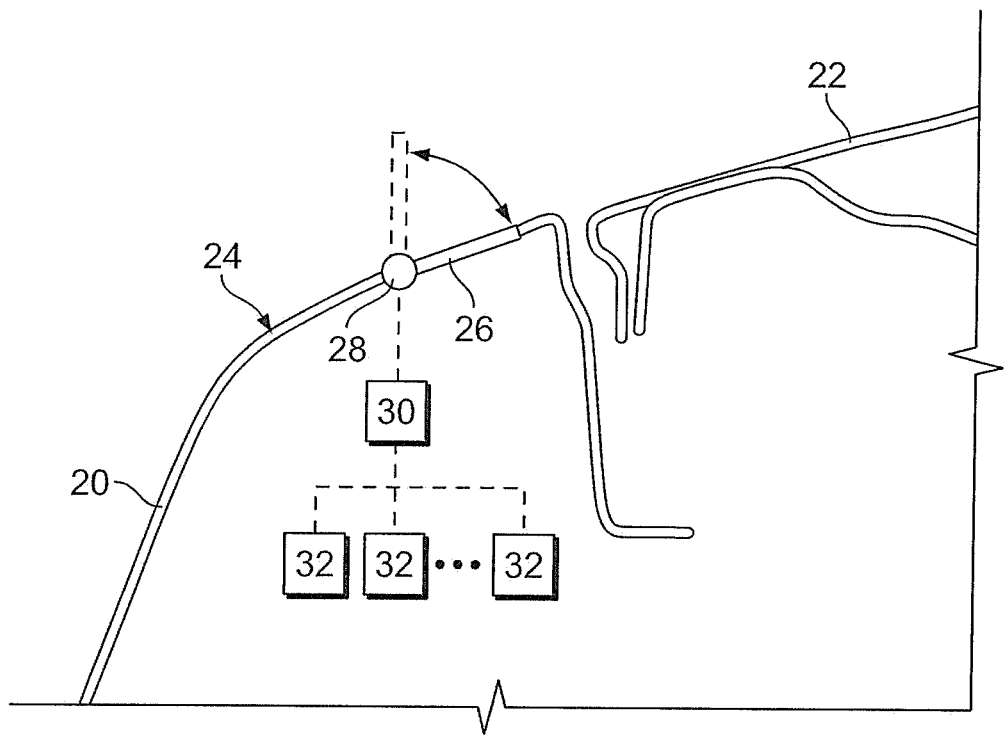
FIG. 2 schematically illustrates a partial cross-section of a hood assembly according to a first embodiment of the present disclosure.

Referring now to FIGS. 1 and 2, an automotive vehicle 10 according to an embodiment of the present disclosure is illustrated. The vehicle 10 has a body 12 which may enclose a passenger compartment. Generally, one or more occupants can be disposed in the passenger compartment. The passenger compartment may be provided with one or more doors that open and close to allow the occupants to enter and exit the vehicle 10. The body 12 includes a fore portion 14 and an aft portion 16, with a plurality of fascia pieces or panels, some or all of which are visible from the outside of the passenger compartment of the vehicle 10. The fore and aft portions 14, 16 are spaced from each other along a longitudinal direction x of the vehicle 10. The sides of the vehicle 10 are spaced from each other in a lateral direction y. The lateral direction y is transverse or perpendicular to the longitudinal direction x of the vehicle 10. The top and bottom of the vehicle 10 are spaced from each other in a vertical direction z. The vertical direction z is transverse or perpendicular to the longitudinal direction x and the lateral direction y of the vehicle 10.

Generally, the fascia pieces or panels surround the vehicle 10. The fascia pieces or panels include a front fascia 20 surrounding a grille 18, and may also include a rear panel which can include a rear fascia, and side panel(s) which can include front quarter panel fascia(s) and rear quarter panel fascia(s). Generally, the front fascia 20 is disposed along the fore portion 14 of the vehicle 10, and the rear fascia is disposed along the aft portion 16 of the vehicle 10. The front quarter panel fascia(s) can be disposed adjacent to the front fascia and the rear quarter panel fascia(s) can be disposed adjacent to the rear fascia.

The fore portion 14 is provided with a closure panel 22, which may be referred to as a hood. The closure panel 22 is a movable panel configured to selectively permit access to an interior compartment of the fore portion 14, e.g. an engine compartment. When closed, the closure panel 22 is generally flush with the front fascia 20 to define an upper surface 24 of the fore portion 14.

An air deflector 26 is provided at the upper surface 24. The air deflector 26 is movable between a stowed position and a deployed position, as illustrated in FIG. 2. In the stowed position, the air deflector 26 is generally flush with the upper surface 24, thereby permitting air to flow generally freely across the upper surface 24 and conforming to desired styling. In the deployed position, the air deflector 26 projects away from the upper surface 24 to disrupt air flow along the upper surface 24. Any pressure differential between the upper surface 24 and the underbody of the vehicle may thereby be mitigated, reducing lift at the front of the vehicle and increasing traction.

In the embodiment illustrated in FIGS. 1 and 2, the air deflector 26 includes an elongate panel extending generally parallel to the lateral axis for substantially the full width of the vehicle 10. The elongate panel has a fore edge pivotably coupled to the front fascia 20 at a location foreword of the closure panel 22. The elongate panel may thereby be pivoted relative to the front fascia 20 such that the aft edge projects away from the front fascia 20. However, as will be discussed in further detail below, in other embodiments within the scope of the present disclosure the air deflector may take other configurations.

An actuator 28 is coupled to the air deflector 26 and configured to actuate the air deflector 26 between the stowed position and the deployed position. The actuator 28 may include one or more of an electric motor, hydraulic actuator, electromechanical actuator such as a solenoid, any other appropriate actuator, or a combination thereof. The actuator 28 may be directly coupled to the air deflector 26, or may be indirectly coupled via gearing or other linkage.

The actuator 28 is under the control of a controller 30. While depicted as a single unit, the controller 30 may include one or more additional controllers collectively referred to as a "controller." The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 30 is configured to control the actuator 28 based at least in part on signals from one or more sensors 32. The one or more sensors 32 may include, for example: at least one sensor configured to detect a vehicle braking condition indicating vehicle brakes being applied, e.g. a brake pedal sensor or an accelerometer; at least one sensor configured to detect a vehicle steering condition indicating lateral acceleration of the vehicle, e.g. a steering wheel position sensor or a lateral accelerometer; at least one sensor configured to detect vehicle speed, e.g. a wheel speed sensor; at least one sensor configured to detect a current position of the vehicle, e.g. a GPS or other geolocation module; additional sensor types; or any combination of the above. A control schema according to an embodiment of the present disclosure will be discussed below with respect to FIG. 5.

Figure 3:
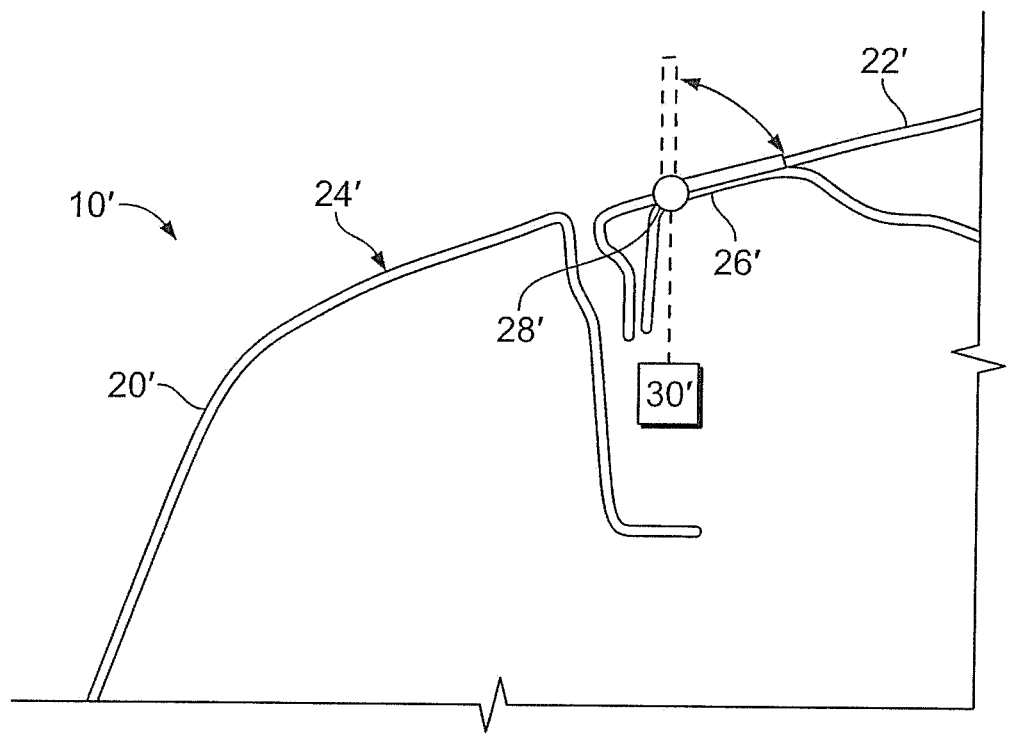
FIG. 3 schematically illustrates a partial cross-section of a hood assembly according to a second embodiment of the present disclosure.

Referring now to FIG. 3, a second embodiment according to the present disclosure is illustrated. In this embodiment, a vehicle 10' is provided with a front fascia 20' and a closure panel 22', which cooperatively define an upper surface 24' in a generally similar manner as discussed above with respect to FIGS. 1 and 2. An air deflector 26' is provided at the upper surface 24'. In this embodiment, the air deflector 26' has a fore edge pivotably coupled to the closure panel 22' at a location aft of the front fascia 22'. An actuator 28' is provided under the control of a controller 30'. The actuator 28' is configured to, in response to a command from the controller 30', pivot the air deflector 26' relative to the closure panel 22' such that an aft edge of the air deflector 26' projects away from the closure panel 22'.

Figure 4:
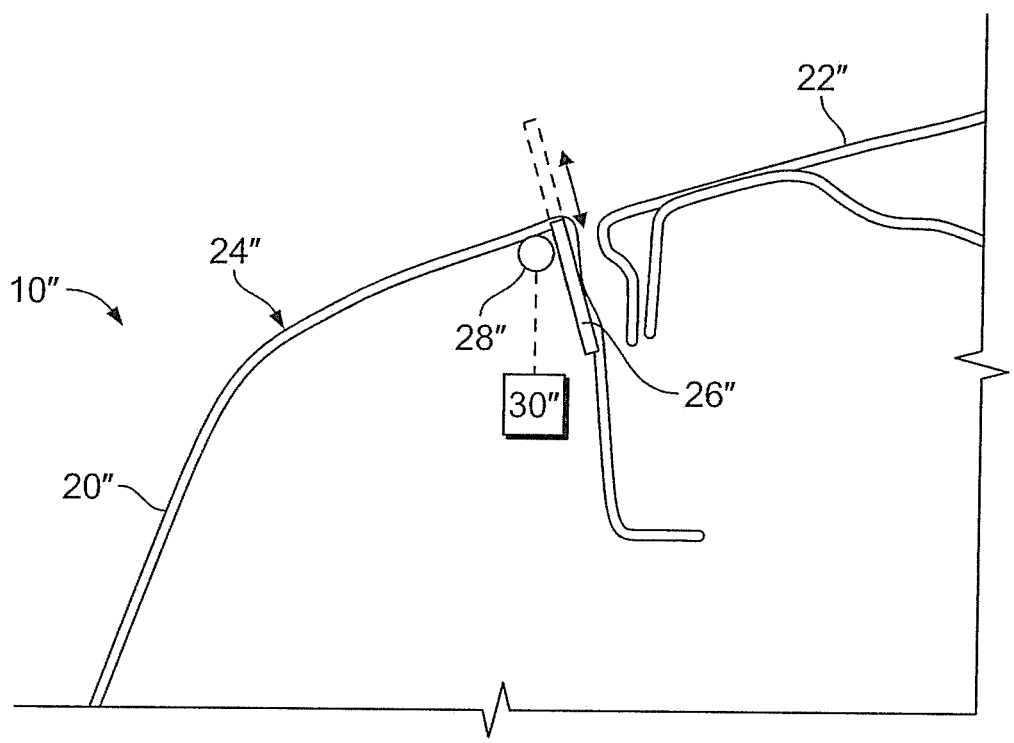
FIG. 4 schematically illustrates a partial cross-section of a hood assembly according to a third embodiment of the present disclosure.

Referring now to FIG. 4, a third embodiment according to the present disclosure is illustrated. In this embodiment, a vehicle 10" is provided with a front fascia 20" and a closure panel 22", which cooperatively define an upper surface 24" in a generally similar manner as discussed above with respect to FIGS. 1 and 2. An air deflector 26" is provided at the upper surface 24". In this embodiment, the air deflector 26" is movably coupled to the front fascia 20" and configured to translate relative to the front fascia 20" in a generally vertical direction. In this embodiment, the air deflector 26" is disposed at a cut line between the front fascia 20" and the closure panel 22"; however, in other embodiments the air deflector 26" may be disposed in other locations on the upper surface 24". An actuator 28" is provided under the control of a controller 30". The actuator 28" is configured to, in response to a command from the controller 30", actuate the air deflector 26" to translate outward from the upper surface 24" to project away from the upper surface 24".

In other alternative embodiments, air deflectors may take other configurations. As an example, multiple air deflectors may be provided in place of a single contiguous air deflector extending across the width of the vehicle. As another example, a movable air deflector may be provided proximate a vehicle roof panel to disrupt air flow over the vehicle roof. Other locations and configurations are, of course, possible.

Figure 5:
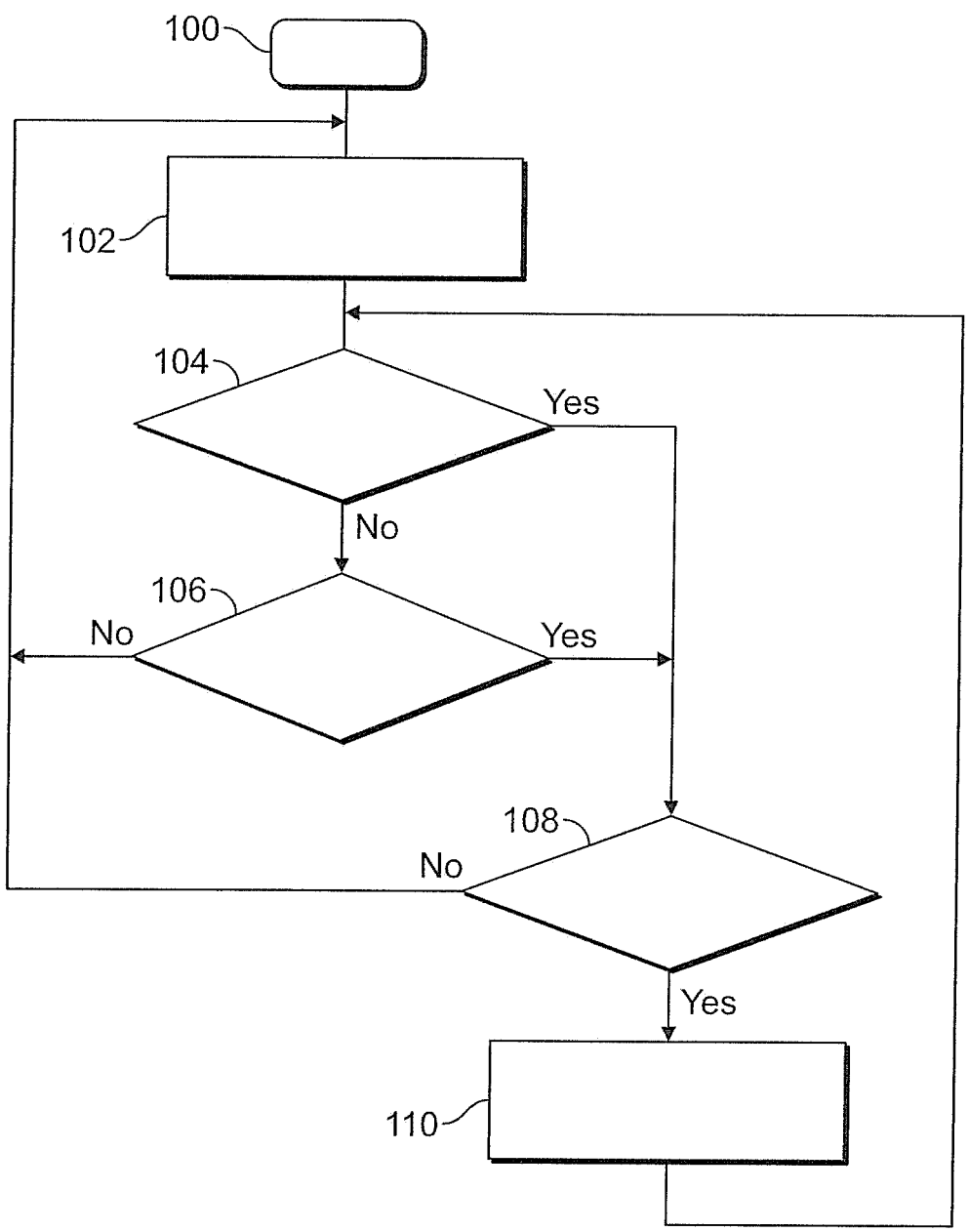
FIG. 5 is a flowchart representation of a method of controlling a vehicle according to an embodiment of the present disclosure.

Referring now to FIG. 5, a method of controlling a vehicle according to an embodiment of the present disclosure is illustrated in flowchart form. In an exemplary embodiment, the algorithm is performed by a controller arranged similarly to the controller 30 illustrated in FIG. 2. The algorithm begins at block 100, e.g. at the initiation of a drive cycle, in response to an operator activation of a performance driving mode via an HMI, or in response to a detected current vehicle location being at a known racing facility such as a track.

The deflector is controlled to the stowed position at the outset, as illustrated at block 102.

A determination is made of whether a turning condition is satisfied, as illustrated at operation 104. The turning condition indicates that lateral acceleration exceeds a predefined threshold. In an exemplary embodiment, this determination is based at least in part on a steering wheel angle measurement from a steering wheel sensor, e.g. a sensor 32 illustrated in FIG. 2. As a non-limiting example, the turning condition may be satisfied in response to a steering wheel angle measurement deviating at least 10 degrees from a nominal position. In other embodiments, the determination may be based on other inputs such as a lateral acceleration measured via at least one accelerometer.

If the determination of operation 104 is negative, i.e. the turning condition is not satisfied, then a determination is made of whether a braking condition is satisfied, as illustrated at operation 106. The braking condition indicates that a longitudinal deceleration exceeds a predefined threshold. In an exemplary embodiment, this determination is based at least in part on a brake pedal position signal from a brake pedal sensor, e.g. a sensor 32 illustrated in FIG. 2. As a non-limiting example, the braking condition may be satisfied in response to a brake pedal being applied at least 20% of the full pedal displacement. In other embodiments, the determination may be based on other inputs such as a longitudinal acceleration measured via at least one accelerometer.

If the determination of operation 106 is negative, i.e. the braking condition is not satisfied, then control returns to block 102. The deflector is thereby maintained in the stowed position unless and until the turning condition is satisfied or the braking condition is satisfied.

If the determination of either operation 104 or operation 106 is positive, i.e. the turning condition is satisfied or the braking condition is satisfied, then a determination is made of whether a current vehicle speed exceeds a predefined threshold, as illustrated at operation 108. In an exemplary embodiment, this determination is based on a speed signal received from a wheel speed sensor, e.g. a sensor 32 illustrated in FIG. 2. In an exemplary embodiment, the predefined threshold corresponds to highway speed, e.g. approximately 50 MPH. However, in other embodiments contemplated within the scope of the present disclosure, other thresholds may be used.

If the determination of operation 108 is negative, i.e. the current vehicle speed does not exceed the threshold, then control returns to block 102. The deflector is thereby maintained in the stowed position unless and until vehicle speed exceeds the threshold.

If the determination of operation 108 is positive, then the deflector is moved to the deployed position, as illustrated at block 110. This may be performed by commanding an actuator, e.g. the actuator 28 illustrated in FIG. 2, to move the deflector to the deployed position. High-speed airflow over the upper portion of the front of the vehicle may thereby be disrupted to increase vehicle traction to support braking or turning requirements.

Control then returns to operation 106. The deflector is thereby maintained in the deployed position until the turning condition and braking condition are no longer satisfied, the vehicle speed falls below the threshold, or both.

As may be seen, the present disclosure provides a system for increasing downforce for traction when desired, and moreover does so without unduly increasing drag or adversely affecting vehicle styling considerations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
   a body with a fore portion, an aft portion, a longitudinal axis extending from the fore portion to the aft portion, and a lateral axis extending orthogonal to the longitudinal axis, the body including a front fascia disposed proximate the fore portion and a closure panel with a fore edge proximate the front fascia, the front fascia and closure panel cooperatively defining an upper surface;
   a deflector movably coupled to the upper surface proximate the fore edge, the deflector having a first end and a second end, the deflector being movable between a stowed position and a deployed position, wherein in the deployed position the second end projects an increased distance from the upper surface relative to the stowed position to thereby interrupt a flow of air over the upper surface;
   an actuator operably coupled to the deflector and configured to move the deflector from the stowed position to the deployed position; and
   a controller in communication with the actuator, the controller being configured to, in response to satisfaction of a first operating condition, control the actuator to move the deflector from the stowed position to the deployed position.

2. The automotive vehicle of claim 1, wherein in the stowed position the second end is generally flush with the upper surface.

3. The automotive vehicle of claim 1, wherein the deflector is movably coupled to the front fascia.

4. The automotive vehicle of claim 1, wherein the deflector is movably coupled to the closure panel.

5. The automotive vehicle of claim 1, wherein the actuator is configured to move the deflector from the stowed position to the deployed position by rotating the deflector relative to the upper surface.

6. The automotive vehicle of claim 1, wherein the actuator is configured to move the deflector from the stowed position to the deployed position by translating the deflector relative to the upper surface.

7. The automotive vehicle of claim 1, wherein the deflector extends generally parallel to the lateral axis.

8. The automotive vehicle of claim 1, wherein the first operating condition corresponds to a braking request exceeding a predefined braking threshold or to a steering request exceeding a predefined steering threshold.

9. The automotive vehicle of claim 8, wherein the controller is configured to control the actuator to move the deflector from the stowed position to the deployed position in further response to vehicle speed exceeding a predefined speed threshold.

10. The automotive vehicle of claim 8, wherein the controller is further configured to control the actuator to move the deflector from the deployed position to the stowed position in response to satisfaction of a second operating condition.

11. An assembly for an automotive vehicle, comprising:
    a front fascia configured to couple to a fore portion of a vehicle foreword of a closure panel, the front fascia and closure panel being cooperable to define an upper surface;
    a deflector movably coupled to the upper surface proximate an interface between the front fascia and closure panel, the deflector having a distal end being movable between a stowed position and a deployed position, wherein in the deployed position the distal end projects an increased distance from the upper surface relative to the stowed position to thereby interrupt a flow of air over the upper surface;
    an actuator operably coupled to the deflector and configured to move the deflector from the stowed position to the deployed position; and
    a controller in communication with the actuator, the controller being configured to, in response to satisfaction of a first operating condition, control the actuator to move the deflector from the stowed position to the deployed position.

12. The assembly of claim 11, wherein in the stowed position the distal end is generally flush with the upper surface.

13. The assembly of claim 11, wherein the deflector is movably coupled to the front fascia.

14. The assembly of claim 11, wherein the deflector is movably coupled to the closure panel.

15. The assembly of claim 11, wherein the actuator is configured to move the deflector from the stowed position to the deployed position by rotating the deflector relative to the upper surface.

16. The assembly of claim 11, wherein the actuator is configured to move the deflector from the stowed position to the deployed position by translating the deflector relative to the upper surface.

17. The assembly of claim 11, wherein the first operating condition corresponds to a braking request exceeding a predefined braking threshold or to a steering request exceeding a predefined steering threshold.

18. The assembly of claim 17, wherein the controller is configured to control the actuator to move the deflector from the stowed position to the deployed position in further response to vehicle speed exceeding a predefined speed threshold.

19. The automotive vehicle of claim 17, wherein the controller is further configured to control the actuator to move the deflector from the deployed position to the stowed position in response to satisfaction of a second operating condition.

20. A method of controlling a vehicle, comprising:

providing a front fascia configured to couple to a fore portion of a vehicle foreword of a closure panel, the front fascia and closure panel being cooperable to define an upper surface;

providing a deflector movably coupled to the upper surface proximate an interface between the front fascia and the closure panel, the deflector having a distal end being movable between a stowed position and a deployed position, wherein in the deployed position the distal end projects an increased distance from the upper surface relative to the stowed position to thereby interrupt a flow of air over the upper surface;

providing an actuator operably coupled to the deflector and configured to move the deflector from the stowed position to the deployed position;

providing a controller in communication with the actuator; and in response to satisfaction of a first operating condition, automatically controlling the actuator, via the controller, to move the deflector from the stowed position to the deployed position.

* * * * *